United States Patent [19]

Duncan et al.

[11] 3,793,078
[45] Feb. 19, 1974

[54] NEGATIVE ELECTRODE WITH AN INSULATED BODY OF CONDUCTOR MATERIAL SUPPORTED THEREIN

[75] Inventors: Edward C. Duncan, Palos Verdes; Ernest Levy, Jr., Woodland Hills; John J. Rowlette, Arcadia, all of Calif.

[73] Assignee: Hughes Aircraft Company, Culver City, Calif.

[22] Filed: May 4, 1972

[21] Appl. No.: 250,405

[52] U.S. Cl. .................................. 136/24, 136/182
[51] Int. Cl. .......................................... H01m 45/06
[58] Field of Search ....... 136/24, 26, 28, 29, 30, 31, 136/20, 6 R, 120, 75, 182; 324/29.5; 340/249

[56] References Cited
UNITED STATES PATENTS
2,899,635  8/1959  Yardney ........................ 136/182 X
2,988,590  6/1961  Andre ............................... 136/182
3,460,995  8/1969  Webb .............................. 136/182

*Primary Examiner*—Anthony Skapars
*Attorney, Agent, or Firm*—John A. Sarjeant

[57] ABSTRACT

Modification of a negative electrode with an insulated body of conductor material supported therein and particularly of an electrode of a nickel-cadmium cell supporting an insert of an active conductor therein in parallel with the electrode whose resistance is being measured and the method of determining or monitoring the state of capacity of the electrode and corresponding the state of charge of the battery in which the electrode is utilized.

3 Claims, 2 Drawing Figures

PATENTED FEB 19 1974    3,793,078

3,793,078

NEGATIVE ELECTRODE WITH AN INSULATED BODY OF CONDUCTOR MATERIAL SUPPORTED THEREIN

The invention herein described was made in the course of or under a contract or subcontract thereunder with the Air Force.

BACKGROUND OF THE INVENTION

U.S. Pat. No. 2,988,590 provides a separate electrode connected in series with a negative electrode and a different structure and structural arrangement disclosed in the application of John J. Rowlette, Ser. No. 64,718, filed Aug. 18, 1970, now U.S. Pat. No. 3,720,869, the latter of which is assigned to assignee of this invention or improvement.

PRIOR ART

Many additional attempts have been made over the years to devise structure and a method to determine the state of charge of nickel-cadmium cells. Many such attempts include potassium ion concentration, phase shift, current sharing of parallel batteries, negative electrode resistance, cell resistance, and methods based on cell polarization.

There exists a need for monitoring the state of charge of spacecraft batteries and particularly low orbit satellite batteries in which transmitters have ground command and are not used in uniform schedule. It becomes necessary to know, in a given orbit, whether the battery has sufficient capacity remaining for transmission.

DESCRIPTION OF THE PRESENT INVENTION OR IMPROVEMENT

This invention relates to a method of correlating resistance measurements to determine the state of charge of a nickel-cadmium electrode battery cell (not shown in detail, but primarily used in batteries in spacecraft vehicles, as low orbit satellites, and other remote battery powered equipment including portable TV cameras and the like requiring battery power in which knowledge of battery state of charge is desirable). This disclosure provides novel structure of a negative plate, as a sintered nickel plaque loaded with cadmium hydroxide, as active material, containing a pocket of embedded or countersunk body of similar active material (e.g. of cadmium hydroxide or a mixture of cadmium hydroxide and carbon) serving as an independent to varying degrees conductor in parallel with the plaque in which it is embedded, and its resistance is measured by suitable controlled electrical equipment (not shown).

DESCRIPTION OF THE DRAWINGS

Figure 1:
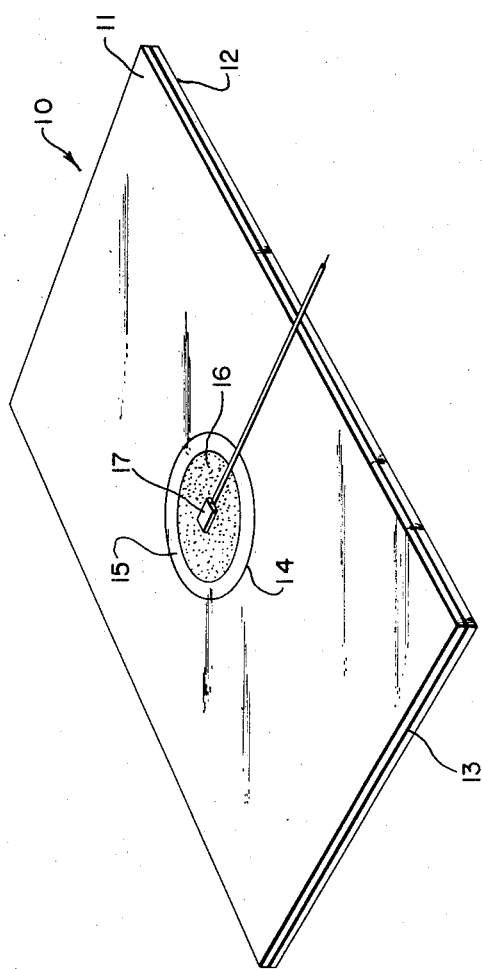
FIG. 1 is a top plan isometric of our modified negative plate connected to an indicator electrode probe.

Referring to FIG. 1, there is shown a conventional negative plate electrode of conductor material of plate sides 11 and 12 sintered onto a conventional perforated center plate 13 (substrate) of steel or the like.

Figure 2:
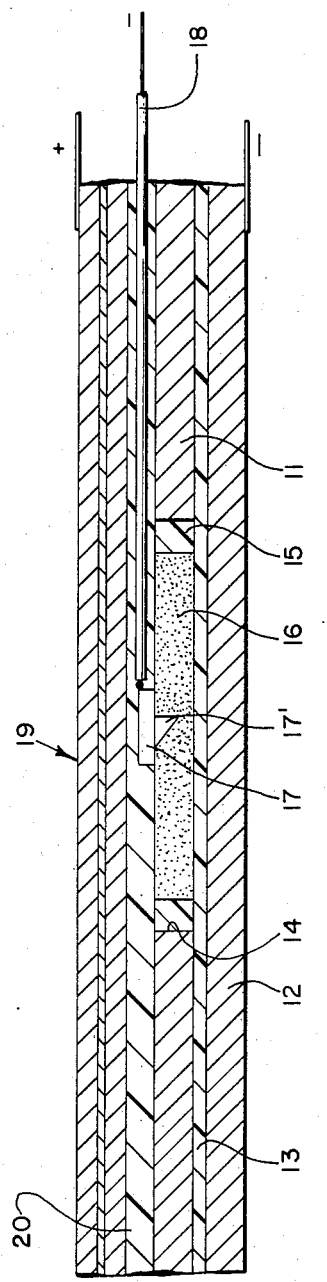
FIG. 2 is a partial cross-sectional view of the structure of FIG. 1 shown in spaced relationship to a positive plate electrode.

In conjunction with FIG. 2, there is machined out from one face 11 of the negative plate 10 a suitable recess or holding cup 14 extending down to the center substrate plate 13. This forms a recess, pocket, or holding cup within the substrate body of the negative plate 10 within which is mounted an insulating ring 15 lining the inside of the recess about the edge or edges of the opening 14.

Inside of the plastic ring 15, the recess is filled with a body of compacted active material 16. Seated on the active material 16 is a conductor probe 17 connected to insulated wire 18. The wire 18 is connected to remote controlled current-inducing and resistance-measuring means (not shown). The probe 17 is preferably provided with a pin or pins 17' as holding means, adapted to be embedded in the active material 16. Otherwise, the conductor probe is seated on the active material in order to make the resistance measurement by passing a small current (conventional apparatus therefor not shown) between the probe 17 and the negative plate 10. The potential difference caused by the current is measured and from this the resistance inferred, or electrically indicated or recorded by instrumentation, not shown.

As further illustrated in FIG. 2, a conventional positive plate 19 with suitable lead-in or positive terminal is normally contained in the battery and maintained in spaced relationship to the negative plate 10 and probe 17 by a suitable insulating separator of natural or synthetic insulation material 20 overlying the measuring probe 17 and its conductor wire 18.

BRIEF DESCRIPTION OF A PREFERRED EMBODIMENT

The negative plate 10 is of a conventional nickel plate structure, provided with a recess 14 lined about its inside edge with a plastic ring, of nylon or the like 15, and within which is embedded a pressed body of granular cadmium hydroxide over which the conducting probe 17 is positioned to make a resistance measurement. A small current (by structure not shown) is passed between this probe and the plate, and the potential difference caused by the state of the active material on the current is measured and the resistance indicated and/or recorded by suitable indicator means (not shown). As the cell is charged, the active material 16 in the negative plate 10 changes from a nonconductor (cadmium hydroxide) to a conductor (cadmium metal). In nickel-cadmium cells (overall structure not shown) which contain a sintered-nickel negative electrode or negative plaque modified to contain the active material as cadmium, the overall effect of this electrode or plaque is that it amounts to a conductor in parallel with the active material whose resistance is being measured.

It is preferred that the current be AC and not DC, since in high state of discharge, the resistance is determined largely by the resistance of the electrolyte which is contained in the battery (not shown per se) and fills the space between the cadmium hydroxide grains. DC polarizes an electrolyte and leads to a distorted curve correlating resistance and state of charge.

Having described and illustrated the present embodiment of this invention, improvement and/or discovery in the art in accordance with the patent statutes, it will be apparent that some modifications and variations including suitable mixtures of the embodied components may be made without departing from the spirit and scope thereof. The specific embodiments described are given by way of examples illustrative of the changes and improvement discovered applicable herein.

What is claimed is:

1. A negative battery plate electrode consisting of a first conductor material on both sides of a substrate characterized by a holding cup within the body of the negative plate, an insulating ring mounted within said cup and supporting therein a second active conductor material insulated from one of the electrode sides around the edges of the holding cup and a means for forming a closed loop between the negative electrode and the separately insulated second conductor material.

2. The structure of claim 1 wherein the negative substrate consists of a nickel plaque and the second active conductor material is selected from the group consisting of cadmium and cadmium and carbon mixture.

3. The structure of claim 2 wherein the said negative electrode substrate comprises a laminate of nickel conductor material and said second active conductor body is particulates of cadmium material contained in a pocket in said negative electrode.

* * * * *